Patented Feb. 22, 1927.

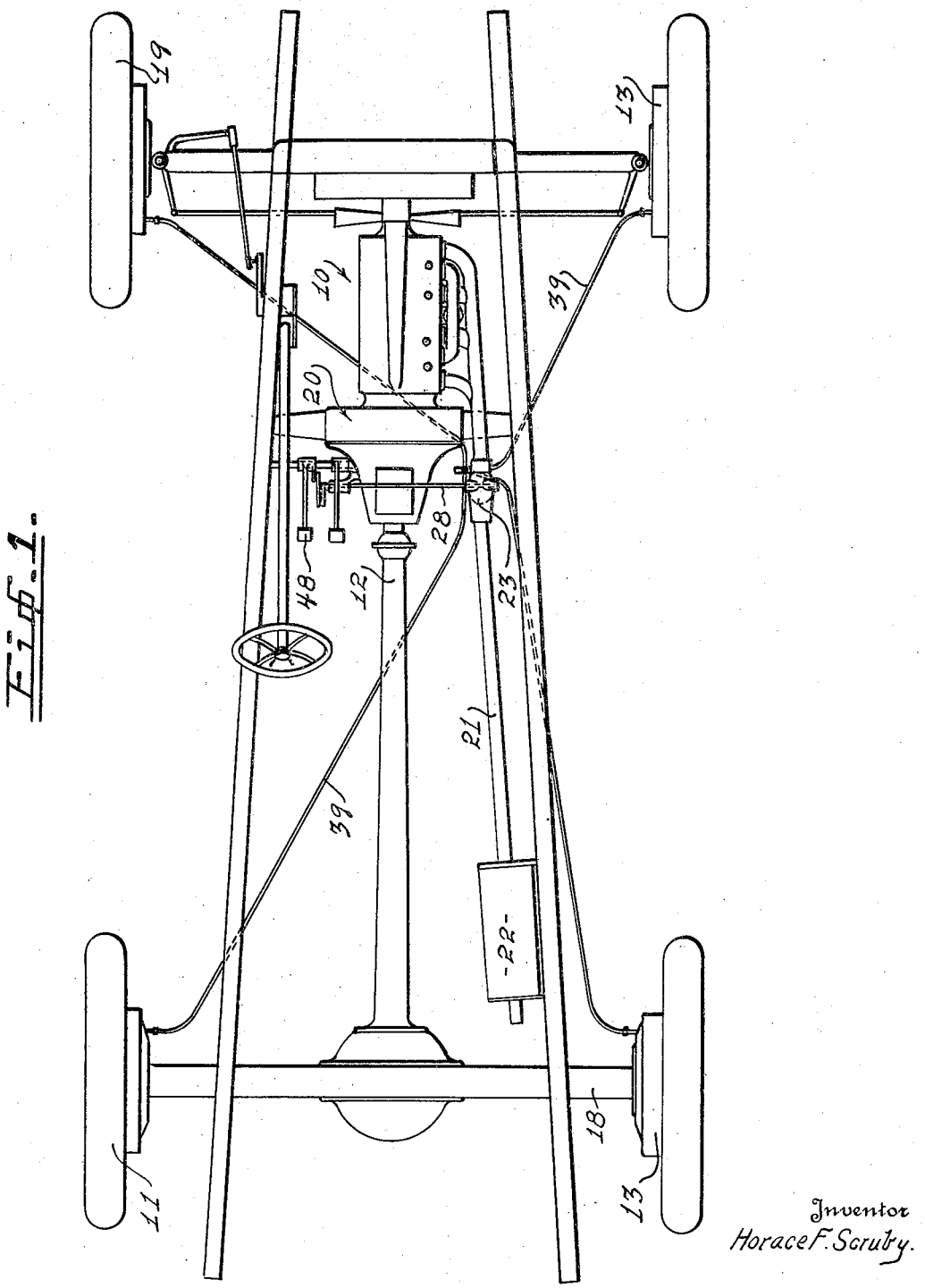

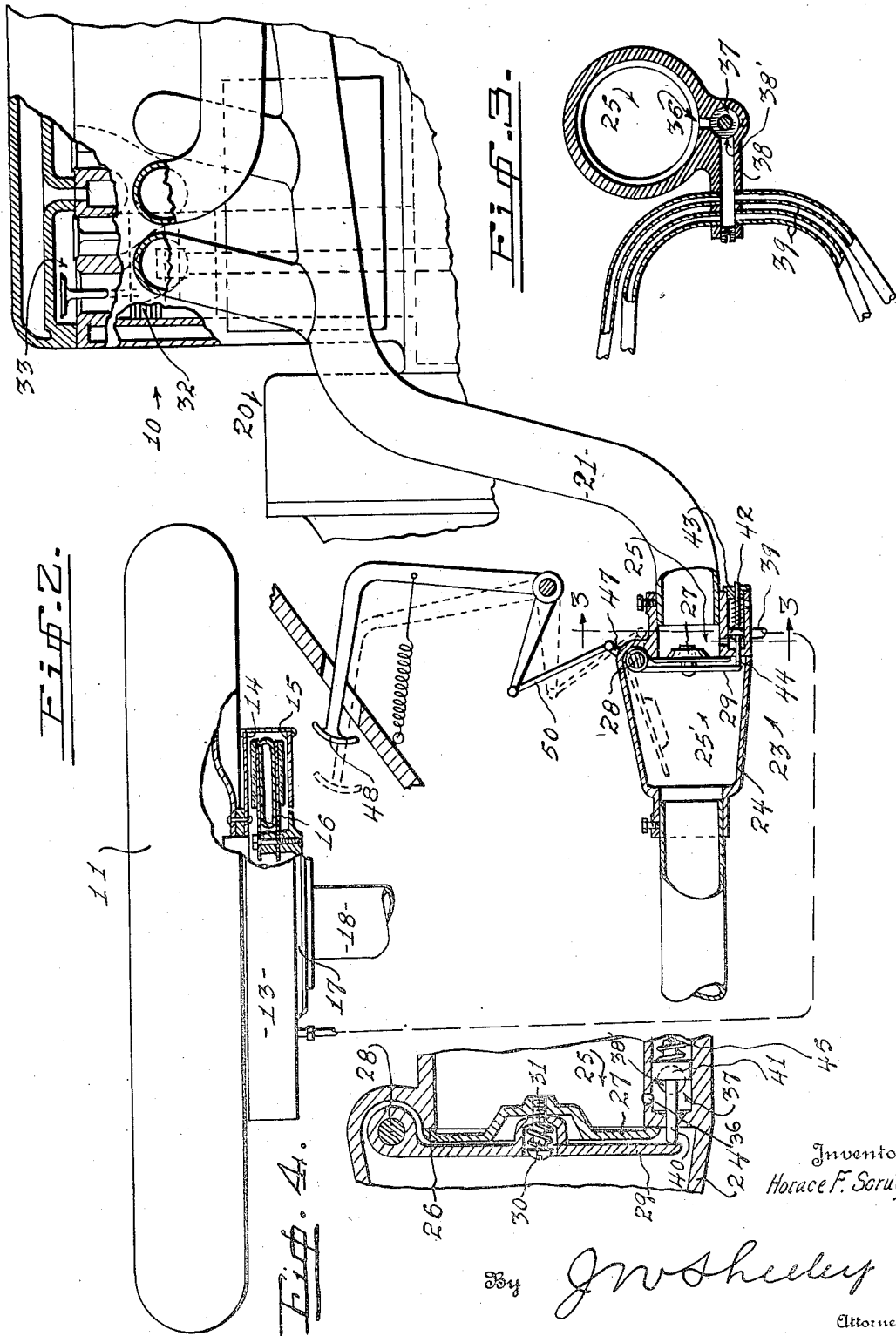

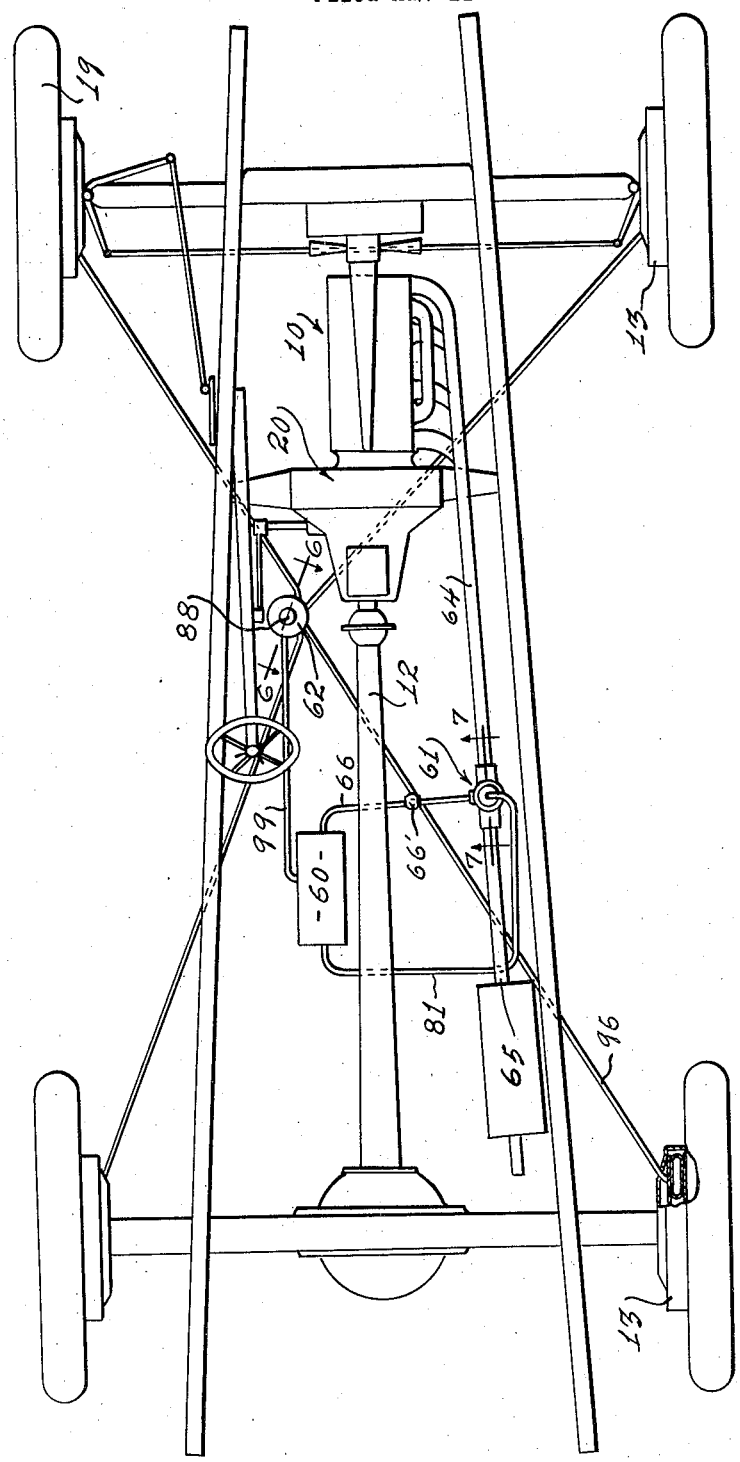

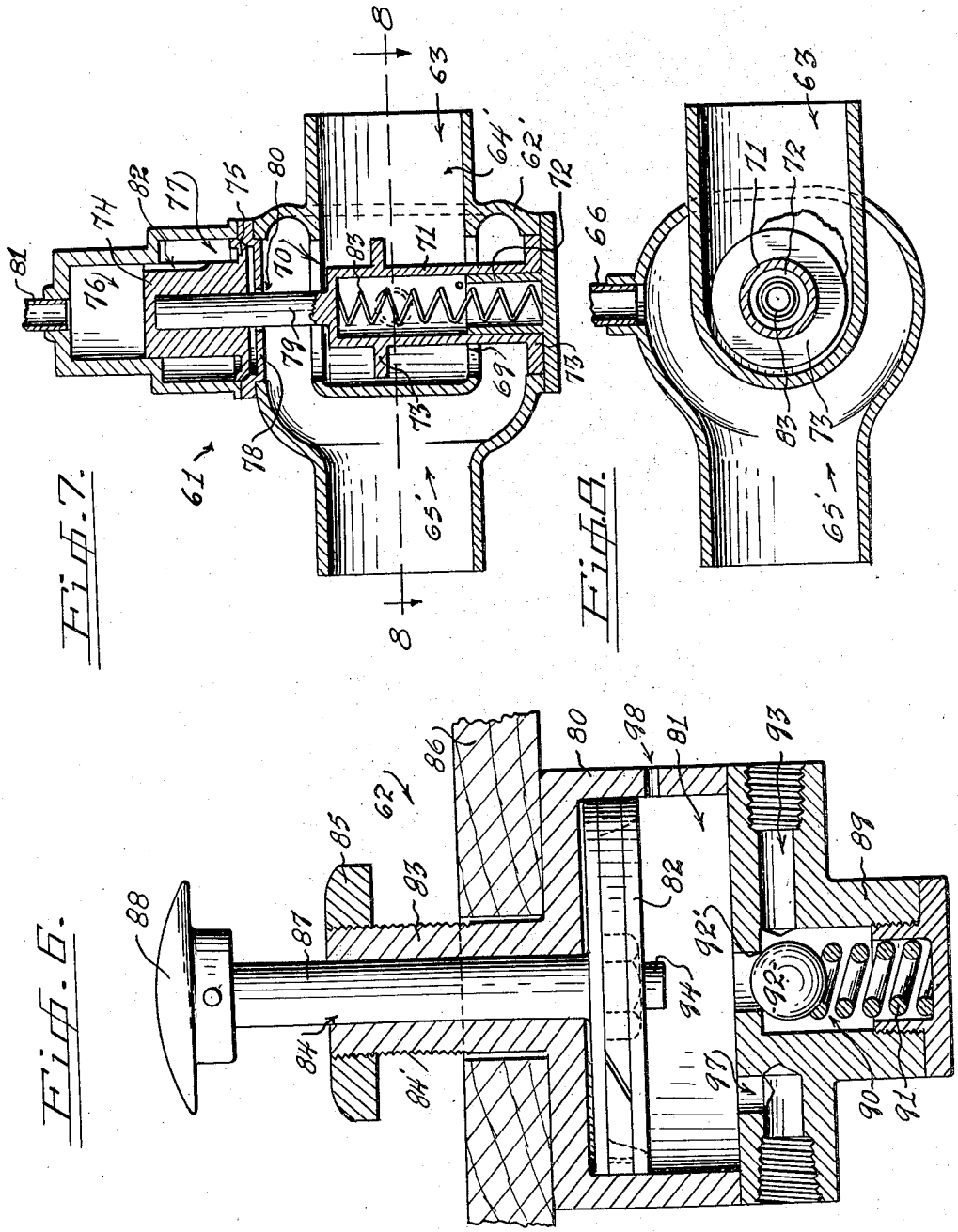

1,618,607

UNITED STATES PATENT OFFICE.

HORACE F. SCRUBY, OF LOS ANGELES, CALIFORNIA.

MEANS FOR BRAKING MOTOR VEHICLES.

Application filed August 11, 1924. Serial No. 731,473.

My invention relates to automotive vehicles of the internal combustion engine type, and pertains more particularly to methods and means for braking such vehicles.

The invention has for its principal object the provision of more effective braking means.

Another object of the invention is to provide means for braking such vehicles whereby the frictional contact of brake surfaces is not depended upon entirely to arrest the inertia of a moving vehicle.

Another and important object of the invention is to provide a vehicle braking system of either two wheel or four wheel brakes whereby the failure of any one brake will not affect the operation of the other brakes.

Another object of the invention is to provide a braking method and means whereby the braking action is rapid and effective in the ultimate without the first braking action being too sudden, so that the usual initial excessive strain to which the wheels and tires are subject is reduced.

Another object of the invention is to provide for employing pneumatics to operate the brakes without the necessity of air compressors.

Still another object of the invention is to provide for effective braking action on long mountain grades without the necessity of placing all the braking load upon friction surfaces.

My invention contemplates the use of low pressure air in conjunction with pliable inflators of rubber, fabric and the like, and it is another object of this invention to tend to keep moisture, oil, grease and other foreign matter out of the inflator.

Still another and quite important object of my invention is to provide means whereby the driver may be enabled to predetermine the rate and effectiveness of application of the brakes. It will be understood that ordinarily in air brakes and the like the operator cannot predetermine such quantities. In common practice, a valve is opened and the air pressure, whatever it may be, is fully effective almost before the operator can make it otherwise.

Other objects and advantages of my invention will appear hereinafter, and will be better understood by virtue of the order in which they will appear.

I have illustrated by the accompanying drawing my invention in two different embodiments.

In said drawings,

Figure 1 is a plan view of a motor vehicle showing, in general, one application of my invention;

Figure 2 is a diagrammatic arrangement of some of the parts shown in Fig. 1, including the engine, which is shown particularly in side elevation with parts broken away to reveal underlying parts, also a part hereinafter known as the valve, which is shown in vertical section; the view further showing one rear wheel and its brake in plan view with parts of the brake broken away to reveal internal parts.

Figure 3 is a view in section on a line 3—3 of Fig. 2.

Figure 4 is an enlarged detail vertical section of the principal portion of the valves shown in Fig. 2.

Figure 5 is a plan view of an automotive vehicle chassis to which is applied one other embodiment of my invention.

Figure 6 is an enlarged detail vertical section of a part hereinafter known as the controller.

Figure 7 is an enlarged detail vertical section of a part hereinafter known as an automatic charging valve.

Figure 8 is a view in section thereof on a line 8—8 of Fig. 7.

Referring particularly to Figures 1, 2 and 3, the automotive vehicle shown includes a four cycle internal combustion engine 10 driving the rear wheels 11 thereof through a propeller shaft 12 in the customary manner. A rear wheel is shown as carrying a brake drum 13 having brake surfaces 14 and 15 between which are arranged a pair of friction faced plates 16. Said plates are carried by a torque plate 17 which is fixed relative to the axle housing 18. The friction plates are normally held away from corresponding braking surfaces by their natural resiliency, as in the case of the brake set forth in my co-pending application Serial No. 12,791.

In describing and illustrating my present invention, I have shown the same brake as that set forth in the above mentioned application mainly because it was particularly designed to be employed in connection with the method I am about to disclose. However, it will be apparent hereinafter that I may employ any type of brake which is adapted to be actuated by the air pressures which my invention provides.

In the accompanying drawings, similar brakes are shown on front wheels 19 as well. The usual clutch between the engine and rear wheels is indicated at 20. Front wheel brakes are advantageous and increase the effectiveness of the braking action provided they are arranged to operate in perfect unison with the rear wheel brakes. It will be apparent hereinafter that I provide for subjecting all of the brakes to the same pneumatic pressure, it being understood that preferably all four brakes are the same in size and equally affected by a given air pressure.

In conformance with the salient feature of my invention in the first illustrated embodiment, the usual exhaust line 21, leading to and through the muffler 22, is provided with a special valve 23, so that the flow of gases outward through the exhaust line may be intercepted or shut off entirely. Said valve includes a hollow body casting 24 having an internal space 25 through which the exhaust ordinarily passes freely to the muffler and thence to the atmosphere. Said casting is formed with an annular valve seat 26 which encompasses the exhaust passage and upon which a floating valve disk 27 is adapted to rest. Transversely of the body and space 25 and above the valve seat, a rock shaft 28 is provided. A plate 29 is fixed to said shaft so that upon partial rotation of the shaft said plate is swung from dotted line position, where it does not retard the exhaust gases, to the position shown, where it brings the valve to the seat and closes off the flow of gas. Said valve disk is carried by the plate and is self adjusting by virtue of the pin 30 and spring 31 which secure it to said plate.

It will be apparent now that upon the disk being held upon the seat the exhaust gases cannot escape from space 25' or the line leading to it. Now, when the only exhaust passage or passages leading from a four-stroke-cycle internal combustion engine is closed, then said engine functions as a positive air compressor. During the usual intake stroke of the piston 32 atmospheric air or mixture at atmospheric pressure enters the cylinder 33. The compression stroke compresses this charge and at the end of this stroke it is ignited. The contents of the cylinder increases in pressure and is subsequently expanded during the power stroke.

At the end of the power stroke, however, the burnt gases are still higher than the pressure at which they entered the cylinder. The next up stroke of the piston forces the mixture from the cylinder into the exhaust line.

An internal combustion engine operating with the exhaust line so closed will act as a compressor even though the ignition is off. It is true that when the pent up gases in the exhaust line have become higher than the pressure which exists in the cylinder at the end of a power stroke, they will rush back into the cylinder as soon as the exhaust valve opens. However, at that time the intake valve is closed and said gases cannot escape. During the exhaust stroke of the piston, the original contents of the cylinder, plus the gas which backed into the cylinder, will be forced into the exhaust line. Successive cycles of the engine will, therefore, act to steadily increase the pressure in exhaust line.

It will appear hereinafter that I may employ the engine to compress and store up a quantity of gases, or I may use the exhaust gases directly. The embodiment now being described is intended for using the gases directly. From space 25 an outlet port 36 leads to a small cylindrical chamber 37 and from this chamber gases may escape to the respective brakes by way of a manifold 38 and the respective flexible tubes 39. Within the cylinder a stem 40 of smaller diameter is provided. Said stem is provided with an annular enlargement 41 adapted to entirely close port 36. One end 42 of the stem is a close running fit in a bearing sleeve 43 while the other end 44 extends into space 25' to be abutted by the hinged plate when the latter is moved into position to hold the valve upon its seat. A spring 45 acts to normally return and hold the stem in innermost position so that the port 36 is closed when the exhaust line is open. It will be seen that when port 36 is closed port 38' is partially open to the cylinder and establishes communication between the interior of the brake inflators and the atmosphere.

As to the operation of the valve, when the plate and valve disk are in dotted line position the exhaust line is open and the port 36 is closed. Therefore, the interiors of the brake inflators are free and open to the atmosphere and closed from the exhaust line. When the plate is in position to seat the valve disk, the spring pressed stem is moved to uncover port 36 and bring it into communication with port 38'. At the same time, the annular enlargement carried by the stem forms a barrier between port 38' and the vent opening. Therefore, as pressure builds up in space 25 it is transmitted through the tubes to the respective brakes. It should be noted here that the pressure is transmitted although the exhaust gases are not necessarily conveyed entirely to the inflators. Even with the minimum practical area of braking surface for the brakes consistent with reasonably long life, I find that only moderate pressures are required. One third of an atmosphere, or about five pounds gage pressure, may be sufficient in such a brake. It will be noted that the volume of the inflator will be small and that there is no escape for air by way of the inflator. Practically speaking, therefore, an increase of five pounds in pressure may not even result in any gas finding its way from the exhaust to the inflator. Instead, the dead air within the inflator is merely compressed by gases moving in the tube and not necessarily reaching said inflator. If the volume of the fluid courses leading to the inflator is sufficiently great with regard to the volume of the inflator, then the above condition will always take place.

The valve is operated by an arm 47 fixed to shaft 28, and said arm is connected to the usual brake pedal 48, through a link 50.

It is preferred to connect the foot pedal and valve directly so that the driver's foot may in itself provide the necessary resilient element to predetermine the maximum pressure to be obtained. The operation of the valve and brake and the effect of the valve upon the engine and the resulting effect of the engine on the brakes is practically apparent from the foregoing description of the operation of the respective parts. The following will more clearly explain the operation of the complete combination of the engine, valve and brakes.

When a car has settled down to a given rate of speed occasion arises to bring the car to a sudden stop. Accordingly, the brake pedal (which will be assumed to be connected directly to the valve) is operated to fully cose the valve. Instantly the valve opens the vent port is shut off from the interior of the valve and said interior is now connected directly with all brakes. The volume of the spaces in which the exhaust gases will now be confined is slight and the pressure will build up very rapidly. The engine now acts as a positive compressor and is capable of building up the pressure to a higher degree than necessary. It is a peculiarity of usual conditions that just when a brake is needed most the exhaust pressure is minimum. For instance, when a car is going at a high rate of speed the driver lifts his foot from the accelerator or otherwise closes the throttle of the engine. Now the rear wheels of the vehicle are rotating the engine at a higher speed than it would ordinarily run with the amount of mixture which passes the practically closed throttle. Therefore, the engine takes in a highly rarefied charge and the pressure of the burnt gases as they are released from the engine is very slight, sometimes even negligible. To merely divert the exhaust at this time would not give enough pressure to operate the brakes, whereas by closing the valve the desired pressure will be attained.

By leaving the clutch in, the rear wheels must drive the engine as long as the car moves. So long as the clutch is in and the car is moving the engine cannot stall and will continue to compress charges into the manifold and brakes. When the driver has obtained the desired braking action, the pedal may be released. One salient feature of my improved braking means is that the brakes are quickly applied, the pneumatic action is highly positive and efficient but the objectionable instantaneous gripping action common to mechanical brakes does not exist. In other words, the desired maximum operating pressure is attained rapidly but not too suddenly and the ultimate braking action is equally effective as compared with mechanical brakes and far less of a strain on tires and wheels.

The most salient feature of the invention resides in the fact that under the most frequently occurring conditions the engine is employed to build the exhaust pressure from a negligible quantity to an appreciable gage pressure. Owing to the practically closed position of the throttle a very large part of the energy used to compress the exhaust gases is obtained from the rear wheels and is obtained by the momentum of the vehicle. Therefore, the braking action that is obtained is partly by friction between brake members and partly by causing the engine, which is connected to the rear wheels, to do useful work. Under conditions where the car is running freely down a grade the exhaust is also very slight or negligible, but by closing the valve the sudden work put upon the engine is very effective in bringing the car to a stop. Obviously, even though a car were running down grade or by momentum, with the ignition turned off or inoperative, the braking action would be equal to any other condition and the desired pressure would be built up in the exhaust line in conformance with the speed of the vehicle.

Still another salient feature of the invention resides in the fact that the compressing action of the engine will always be in conformance with the speed of the vehicle and when the braking action required is maximum it will be found that the engine capacity is maximum because of its rotative speed.

Even leakage in one or more brakes or tubes would not affect the other brakes, because the capacity of the engine is so great. When the car is nearing a stop and the braking action has been found to be sufficient then the clutch may be thrown out, leaving the engine free. The pressure may be retained upon the brakes so long as the foot pedal is held down.

In the form of the invention illustrated in Figures 5 to 8, inclusive, there is provided a tank 60, an automatic charging valve 61, and a valve or controller 62 for allowing compressed gases to flow from the tank to the flexible tubes which connect with the brakes. The automatic charging valve is provided with a through bore 63 which ordinarily forms a part of the exhaust passage from the engine to which it is connected. Respective parts of the usual exhaust pipe, in which the valve is interposed, are indicated at 64 and 65, respectively, and these connect with spaces 64' and 65', respectively. The engine and brakes are not shown in these figures, inasmuch as the apparatus shown in Figure 5 is to take the place of the previously described air valve and foot pedal. The automatic charging valve is connected to the tank through a pipe 66, having a check valve 66'.

Said charging valve includes a body casting 62' provided with an inlet opening 63 and an inlet passage 64', also an outlet passage 65' and two opposed ports 69 and 70, respectively. A spool valve member 71 is floatingly guided by a vertical guide 72. The valve member is provided with two disks 73 which act to simultaneously obstruct the respective ports. Balanced pressure valves of this type are well known and need no further description herein. To automatically operate the valve member there is provided a differential piston made up of pistons 74 and 75, respectively. The piston is reciprocal in a differential cylinder having chambers 76 and 77, respectively. Chamber 77 is in communication at all times with passage 65', although a partition 78 is placed therebetween to protect the piston and cylinder. The restricted clearance between the stem 79 of the spool valve and the margins of apertures 80 provide slight cushioning for the piston when it moves suddenly upward. The chamber 76 of the differential cylinder is connected to the tank by a small pressure line 81 so that the smaller diameter of the piston is subject at all times to the pressure in the tank. The only communication between the two chambers is by way of a groove 82 provided in the lower piston. A spring 83 opposes the upward movement of the piston yieldably and predetermines the pressure which must exist in the lower chamber to raise the piston. In the drawing, the piston is shown in such position that the groove is almost eclipsed by the cylinder wall. To explain the operation of the valve itself, it will be assumed that the pressure in the tank is lowering and the spring is forcing the spool valve up toward closed position. Just as the spool valve disks come adjacent the ports, the pressure of exhaust gases escaping through the ports will suddenly overcome the spring resistance and close off the flow of exhaust gases. This is because the groove in the piston is then eclipsed by the cylinder wall cutting space 77 from communication with the tank. Consequently gas in space 77 escapes through the clearance 80 more rapidly than it can leak into space 77. Therefore the pressure in space 77 drops quickly, and the spring 83 is no longer compelled to work against the high thrust on the part of the piston 75. The engine will then act to pump gases into the tank. Meanwhile any pressure that existed in chamber 76 has been lost by leakage and chamber 77 is subject to the full pressure of the tank. As the engine fills the tank, the piston is forced downward against the spring until the groove in the piston is uncovered. The larger piston will then be subjected to the pressure being built up in the tank and the net force acting upon the piston is thereby suddenly increased. The spring will then be incapable of holding the piston and as a consequence the piston and spool valve will be lowered to again allow the exhaust gases free flow through the exhaust line. The differential areas of the piston sections are so arranged that the spool valve will close off the exhaust when the pressure has dropped slightly below the pressure at which the spool valve will be moved to open position. Obviously the charging valve will act automatically to keep the tank charged.

Therefore, at practically all times that air is needed for the brakes there will be an initial supply in the tank. It is not necessary that the tank hold any appreciably great supply because the charging valve can be depended upon to come into effect immediately that any air is used. In fact, it is preferred to have the charging valve come into action while the brakes are on in order to obtain the additional braking action of the engine. The operation of the charging valve and the brakes is practically apparent from the immediately foregoing, and I will now describe more fully the construction and operation of valve 62. A salient feature of the invention resides in this valve which enables the driver to "feel" the brakes, or in other words, to predetermine, without thought or effort other than that ordinarily required, the pressure which will be released to the brakes. In the first described embodiment of the invention I described means whereby the driver feels the actual resistance of the exhaust gases in order that he may know the pressures which will act on the brakes. It will be apparent hereinafter that valve 62 enables the driver to feel the force of the pressure which is applied to the brakes.

Valve 62 includes a cylindrical body casting 80 formed with a cylindrical chamber 81 in which is reciprocal a piston 82. The body is provided with an elongated cylindrical stem 83 having a concentric bore 84. The stem 83 is externally threaded as at 84' and provided with a nut 85 whereby the body may be quickly and permanently attached to a floor board 86 as shown. A piston rod 87 leads from the piston through the bore of the stem to terminate externally in a button 88. The valve is placed in the floor board of a vehicle so that the button comes in the place ordinarily occupied by the brake pedal. A large boss 89 is provided on the body casting and is formed with a central bore 90 containing a spring 91 and a ball 92 yieldably held by the spring upon a seat 92' arranged at the upper end of the bore. Air may flow from the tank to bore 90 through port 93 but the air will not flow further as long as the ball is held on its seat. An extension 94, to the piston, projects downwardly from the piston whereby the ball may be unseated by depressing the piston. At any time that the piston is released any air contained in the cylindrical space will force the piston upwardly until a vent port is uncovered. The normal position of the parts is as shown, the interior of the brake inflators being now vented to the atmosphere through tubes 96 and ports 97 which lead into the cylindrical space. It will be apparent now that when the ball is unseated fluid from the tank will flow into the valve and escape by way of ports 97 to the brakes. The ball can be unseated only by the piston and when so unseated the vent port 98 is, of course, closed. Under that condition the piston will be subject to the full pressure which is acting on the brakes. To best understand the operation of the valve and its advantages in controlling air brakes, let us assume that the operator desires to put a pressure of about five pounds into the brakes although he knows that the pressure contained within the tank is considerably in excess of five pounds. Instinctively he will force the button down with his foot with only enough force to oppose a pressure of five pounds per square inch on the piston. Such force will, of course, force the piston down and unseat the valve. Air rushes by the unseated ball to the brakes and acts on the piston. The pressure in the tank being in excess of five pounds per square inch, the piston is almost immediately subject to a pressure sufficient to oppose the operator's foot. As a consequence, the piston is moved enough to allow the valve to seat and shut off the air from the tank before it can build up to a pressure in excess of that allowed by the operator's foot pressure.

With my improved control valve for air brakes the braking action that may be obtained is within the operator's control and may be predetermined by him. Considering the apparatus shown in this form of the invention as a whole: The charging valve will keep the tank charged. Any desired amount of pressure up to maximum may be released to the brakes as described. At any time that the control valve is open the pressure in the tank lowers and immediately the automatic charging valve closes off the exhaust line. Therefore, the braking action of the brakes is augmented by the braking action of the engine just as in the case of the first described embodiment of the invention. Having admitted the desired pressure to the brakes, the operator may hold the brakes applied as long as he desires by keeping up a given foot pressure on the button. Should there be an appreciable leak in the brakes, the foot pressure which he exerts would again act to unseat the ball when the pressure drops. As long as the engine is running, or as long as there is ample air in the tank, the driver may keep a predetermined and constant pressure on the brakes by resisting the piston with a constant foot pressure. At any time that he desires to release the brake, the piston is released. The pressure in the brakes will raise the piston until the vent port is uncovered, whereupon the brakes are free to assume normal inoperative pressure. Under conditions where the brakes are used constantly or frequently, or under trying conditions, the driver may hold the piston practically in contact with the ball without actually admitting any air to the brakes. With the parts held in such conditions, the merest instinctive movement on the part of the driver's foot will act to set the brakes. In descending long grades a slight but constant pressure can be maintained in spite of high pressure in the tank. Ordinarly, where brakes are operated by compressed air or gases the operator has no control over the air pressure except by constant and wasteful manipulation of an air valve.

It will be apparent now that I have provided a novel and efficient method and means for arresting the motion of engine driven vehicles as well as novel and efficient means for regulating and predetermining the rate and force at which the brakes will be applied, and while I have set forth specific methods and means I do not limit myself thereto, but may alter the embodiments described as I desire without enlarging the scope of my invention within the appended claims.

I claim:

1. A controller for fluid pressure brakes of an automotive vehicle, embodying a cylinder enclosing a space and provided with an inlet opening leading to said space and an outlet opening leading from said space, a valve movable to open and closed positions, respectively, controlling said inlet opening and normally disposed in closed position to prevent ingress of fluid to said space, a piston reciprocal in said cylinder and movable toward said valve to decrease the effective volume of said space; said valve arranged to be moved to open position by such movement of the piston; said cylinder embodying an annular wall provided with a vent port opening into space and arranged to be closed by said piston when the piston moves to open said valve, a rigid stem projecting from said piston through said cylinder to points externally of said space, and a push button rigidly connected to said stem.

2. In a controller, a valve, valve opening means comprising a depressible piston movable in a given direction to open said valve, means for causing the piston to be urged in the opposite direction by the pressure of the fluid moving through the valve when same is open, and a push button rigidly connected with said piston; the controller being devoid of resilient connections between said button and piston.

3. In an automotive vehicle, an internal combustion engine, rear wheels driven by said engine, an exhaust line for said engine, a tank connected with said line, an automatic charging valve, a line leading from said exhaust line to said tank between said engine and said valve; said valve movable automatically, by a pressure reduction in said tank, to closed position to direct exhaust gases into said tank, whereby rotation of the rear driving wheels will drive said engine to cause same to force exhaust gases into said tank, fluid pressure brakes for each of said rear wheels, a line leading from said tank to said brakes, a foot actuated controller in said line, a foot-pressed button for operating said controller, a valve to said controller movable to admit air from said tank to said brakes, and a movable wall to said controller rigidly connected to said button and movable to open said valve; said valve disposed to subject the piston to the pressure of fluid passing through it whereby said piston is urged away from the valve opening by such pressure.

HORACE F. SCRUBY.